Dec. 28, 1926.

E. D. PUTT 1,612,536

APPARATUS FOR REENFORCING BEADS

Filed Dec. 22, 1922  4 Sheets-Sheet 1

Inventor

Edward D. Putt

By

Attorney

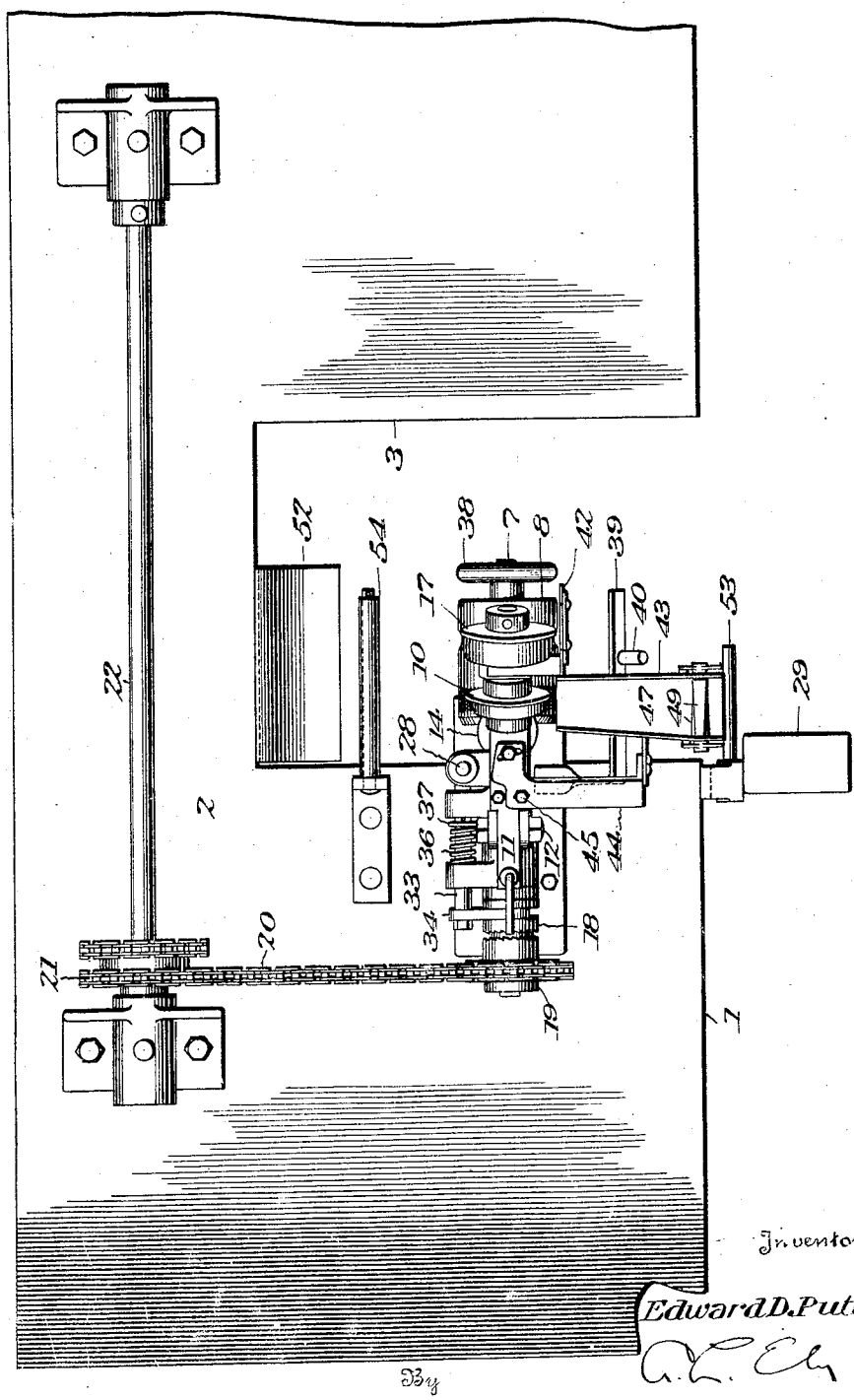

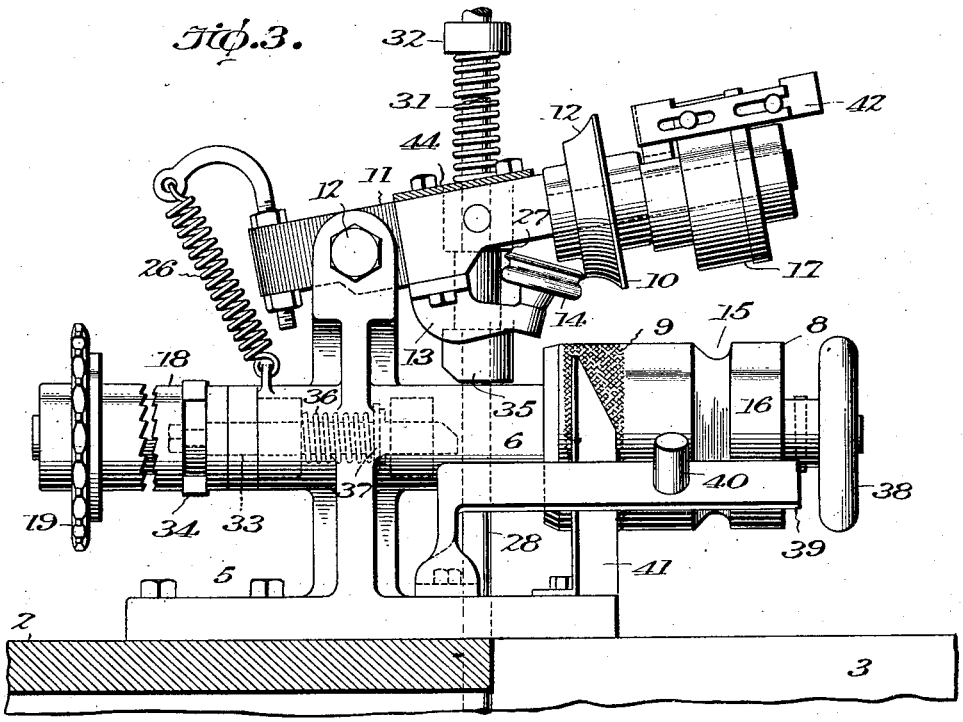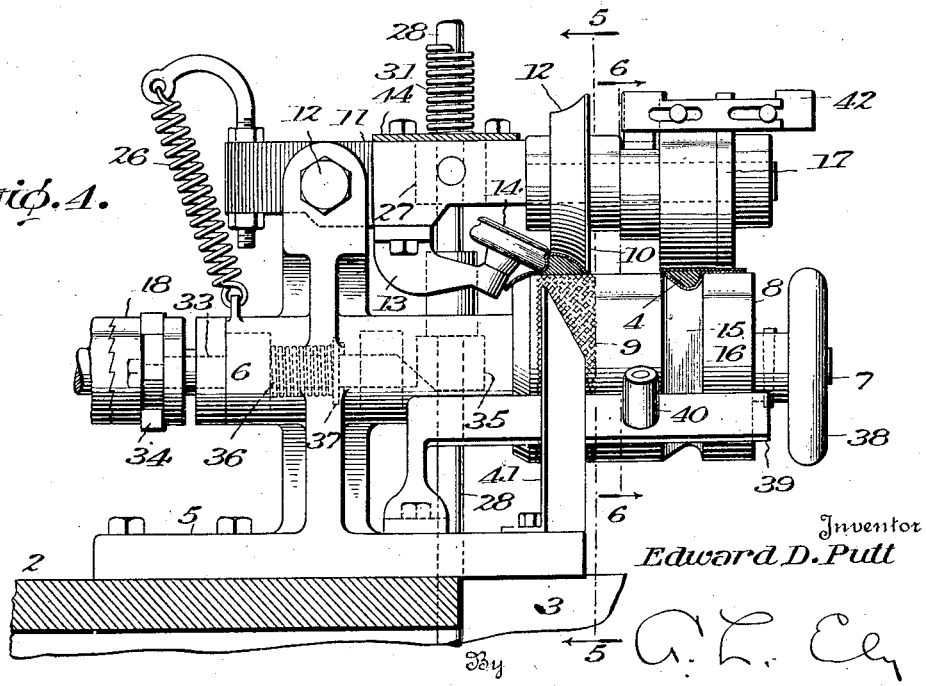

Dec. 28, 1926.
E. D. PUTT
1,612,536
APPARATUS FOR REENFORCING BEADS
Filed Dec. 22, 1922   4 Sheets-Sheet 4
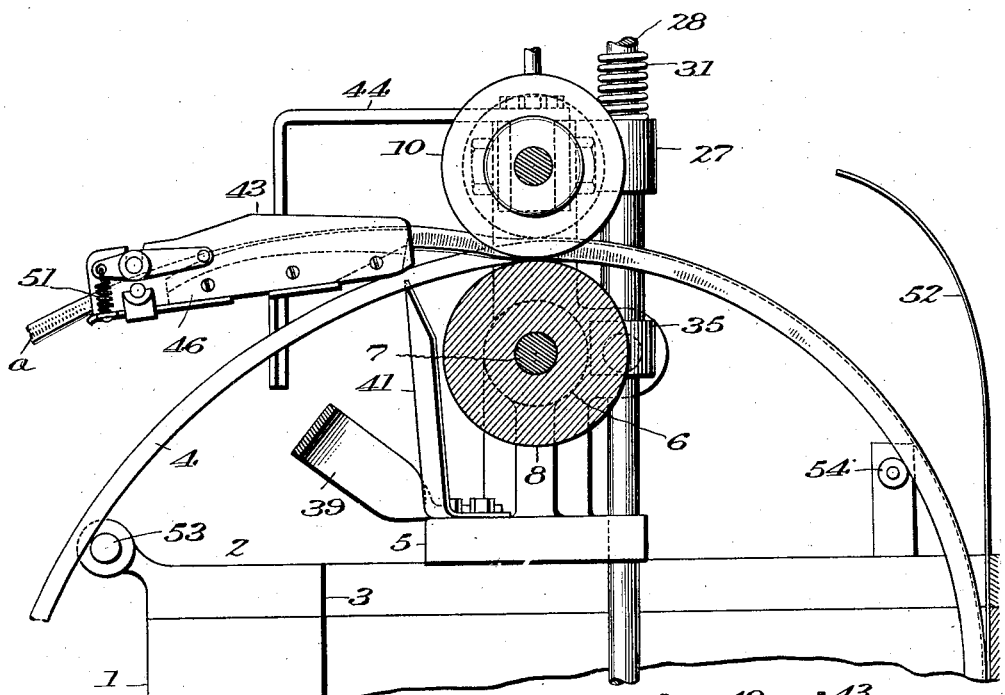
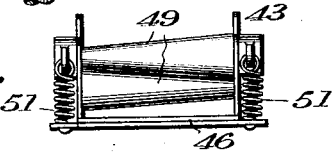
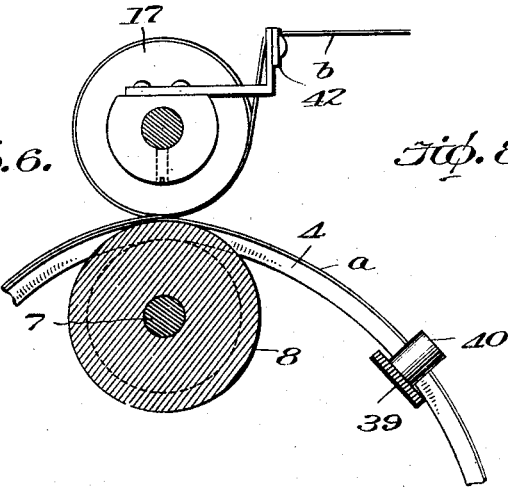
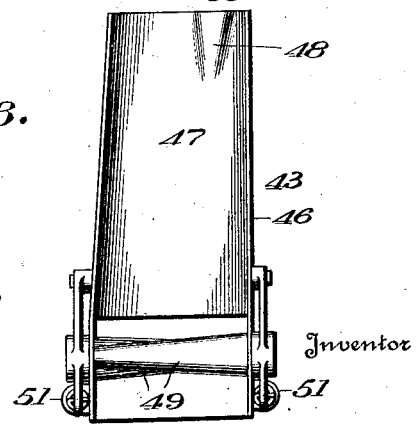
Inventor
Edward D. Putt
By
Attorney Patented Dec. 28, 1926.

1,612,536

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

APPARATUS FOR REENFORCING BEADS.

Application filed December 22, 1922. Serial No. 608,464.

My invention relates to apparatus for reenforcing or covering bead rings for use in the construction of pneumatic tires.

Rubber bead rings, or bead cores, for pneumatic tires are usually covered with strips of tacky fabric to provide a free width of fabric around one edge of the bead that is known in the art as a "flipper strip." The function of this covering and "flipper strip" is to reenforce the bead and securely anchor it in the carcass structure when the tire is vulcanized, all of which will be well understood without further explanation. Prior to my invention this covering and reenforcing operation has been performed with difficulty, particularly upon clincher beads. This difficulty arises primarily from the curved shape of the base and side surfaces of the clincher bead against which it is difficult to position the fabric in an even and unwrinkled condition. Moreover, bead rings are only partly vulcanized before they are incorporated in the tire carcass and they are therefore easily distorted when sufficient pressure is exerted against them to cause the fabric strips to properly adhere to the surfaces thereof.

The purpose of this invention is to provide an apparatus which may be used to quickly and accurately position the flipper strips upon bead rings without wrinkling the fabric or distorting the bead.

My invention is particularly designed to provide an apparatus for performing the above operation upon clincher beads and for pressing the fabric against the curved surfaces with which such beads are formed. As will presently be seen, however, my apparatus may readily be adapted for covering straight side beads.

Specifically, the purpose of my invention is to provide an apparatus for positioning separate fabric strips respectively upon the inner and outer peripheries of a clincher bead with the edges of the strips overlapping, forcing one strip into the concave side face of the bead, and pressing the overlapping portions of the strips together to form the flipper strip proper.

With the foregoing in view, my invention resides in the construction and combination of parts set forth in detail in their preferred assembly in the following description and particularly emphasized in the claims appended hereto.

In the drawings accompanying and forming a part of this specification:

Figure 2 is a plan view of the apparatus partly broken away;

Figure 3 is a detail elevational view, on an enlarged scale, looking at the front side of the apparatus;

Figure 4 is a similar view illustrating the operation of the apparatus;

Figure 5 is a transverse sectional view taken on the line 5—5 of Figure 4;

Figure 6 is a similar view taken on the line 6—6 of Figure 4;

Figure 7 is a detail and elevation of a strip guiding element forming a part of my invention; and Figure 8 is a plan view of the strip guiding element.

Figure 1:
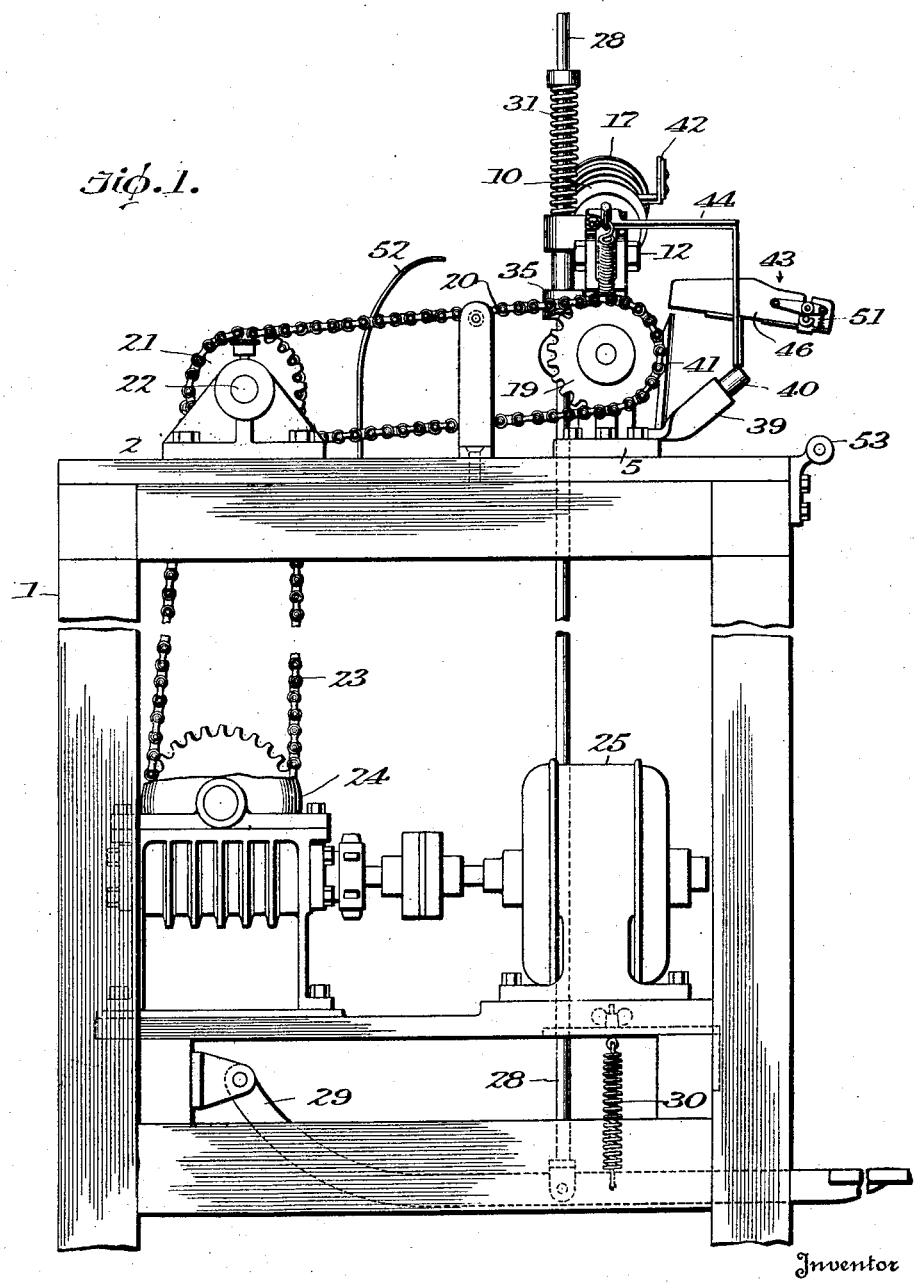
Figure 1 is an end elevational view of an apparatus constructed in accordance with the principles of my invention.

In the drawings, the numeral 1 designates one form of base structure which may be used to support the operating parts of my apparatus. The base structure comprises, in this instance, a table 2 which is provided with a recess 3 opening upon one edge of the table to receive a portion of the bead annulus 4. A bracket 5, embodying a horizontal journal bearing 6, is affixed to the table in such position that one end of the journal bearing overhangs one edge of the recess 3. A horizontal shaft 7 is journaled in the bearing 6 and is driven in a manner presently described. One end of the shaft 7 projects beyond the bearing 6 over the recess 3 and has fixed thereon a cylindrical bead supporting and rotating roller 8. Adjacent its inner end the roller 8 is provided with a scored circumferential surface 9 for receiving and gripping the inner flat face of a clincher bead ring in the position shown in Figure 4 of the drawing. A presser roller 10 is mounted above the roller 8 to be moved toward or away from surface 9 and to engage the roller 8. The roller 10 is carried upon the intermediate portion of a vertically rocking beam 11 that extends parallel with the shaft 7 and is pivoted, as at 12, adjacent one of its ends upon the bracket 5. The roller 10 has its peripheral face 12 concaved to conform with the convex face of a clincher bead ring so that when the beam 11 is rocked in the direction of the roller 8 the bead ring will be gripped between surfaces exactly conforming to the cross-sectional contour of its inner and outer peripheral faces. An arm 13 is affixed to the beam 11 to rock therewith and support a roller 14, the axis of which is inclined so that the curved surface of the roller will conform to the curvature of the bead. The arm 13 and roller 14 are so arranged that when the roller 10 is moved against the base surface of the bead 4, the periphery of the roller 14 will engage and compress the concave, or what may be termed the heel or clincher face of the bead, as shown in Figure 4 of the drawings. The periphery of the roller 14 is shaped to exactly conform to the cross-sectional shape of the heel side of the bead 4 and in this connection it will be noted that the scored surface 9 together with the peripheries of the rollers 10 and 14 form a pass corresponding to the cross-section of the bead. A slight space is provided for between the edge of the roller 14 and the top of the roller 8 for a purpose presently apparent. It will be noted that the pivoted beam 11 provides for removing the roller 14 from engagement with the convex face of the bead in substantially a lateral direction whereby the roller 14 is prevented from bending under the heel of the bead and injuring it during this operation. A groove 15 is provided in the roller 8 and spaced from its outer end to provide the cylindrical surface 16. The groove 15 is shaped to receive the curved sides of the bead ring and to present its flat side uppermost. This is accomplished by turning the bead ring which may readily be done because of its flexible character. Above the groove 15 the beam 11 carries a presser roller 17 in position to span the groove 15 of the roller 8 and a portion of the cylindrical surface 16 thereon.

Upon the opposite end of the shaft 7 a sliding clutch sleeve 18 is provided to engage a sprocket wheel 19 that is mounted to rotate freely upon the shaft. A chain 20 connects the sprocket 19 with a second sprocket wheel 21. The sprocket wheel 21 is fixed upon a shaft 22 that is journaled upon the table 2 parallel with the shaft 7. A sprocket and chain connection 23 connects the shaft 22 with a speed reduction device 24 which is driven by a motor 25.

The beam 11 is normally held in raised position by a spring 26 that connects its pivoted end with the bracket 5 so that the rollers 10, 14 and 17 are normally withdrawn from the roller 8 and a bead ring may be positioned upon the latter roller. In this position of the beam 11, the clutch sleeve 18 is disconnected from the sprocket wheel 19 so that the shaft 7 and the roller 8 are idle. Conversely when the beam is rocked to lower the rollers 10, 14 and 17 upon the roller 8, the sleeve 18 engages the sprocket wheel 19 and the shaft 7 and roller 8 are rotated. This is accomplished through the following devices.

A vertically disposed sleeve 27 is pivoted upon one side of the beam 11 through which the upper end of a vertical rod 28 projects. The lower end of the rod 28 is connected to a suitable foot pedal 29 which is normally pulled upwardly by a spring 30. In order that the rollers 10, 14 and 17 may be yieldingly pressed against the bead ring an expansion spring 31 and set collar 32 are provided between the sleeve 27 and the projecting end of the rod 28. A clutch operating rod 33 is mounted to slide upon the journal bearing 6. One end of the clutch rod 33 carries a forked lever 34 which engages the clutch sleeve 18. A cam collar 35 upon the rod 28 engages the other end of the clutch rod 33, when the rod 28 is moved a sufficient distance to position the rollers 10, 14 and 17 upon the roller 8, and slides the clutch sleeve 13 into engagement with the sprocket wheel 19. Thus the shaft 7 and roller 8 are rotated as soon as the rollers 10, 14 and 17 are in operative position. A spring 36 and collar 37 are provided upon the clutch rod 33 to normally hold the clutch sleeve 18 in disengaged position. If desired, a hand wheel 38 may be provided upon one end of the shaft 7 to manually rotate the roller 8.

In front of the roller 8, I provide a bead guide 39 which carries a projecting roller 40 adjacent the groove 15 arranged to prevent the bead ring 4 from swinging sideways and twisting the groove 15. Also in front of the roller 8 and in line with the scored surface 9 thereof, I mount an upstanding finger 41 to prevent a similar result occurring when the bead ring 4 is positioned between the surface 9 and the rollers 10 and 14. Upon the beam 11 another adjustable guide 42 is mounted across the face of the roller 17. The guide 42 is adapted for adjustment to receive different widths of fabric strips and guide them in flat condition to the rollers 8 and 17.

A combined strip guide 43 and tensioning device is mounted in front of the roller 10 and the scored surface 9 of the roller 8. This guide 43 is mounted upon an arm 44 that projects forwardly from the beam 11. The arm 44 is pivoted upon the beam 11, as at 45, so that the guide may be swung laterally to adjust it, if desired. The guide 43 comprises an elongated ironing shoe 46 having a bottom plate 47 that is convex both crosswise and lengthwise to curve the strip and iron out the wrinkles therein as it is fed between the rollers 8 and 10. At one end the plate 47 is provided with an upstanding lug 48 that rounds the strip transversely adjacent the edge that covers the rounded base face of the bead. At its forward end the guide is provided with a pair of tension rollers 49 yieldingly held together by suitably arranged springs 51. The rollers 49 are designed to grip a strip of fabric before it is fed between the rollers 8 and 10 and draw it taut over the plate 47 and lug 48 against the pull of said rollers 8 and 10. At the rear of the recess 3 a guard 52 is mounted to prevent the bead ring from bulging and scraping against the edge of the aperture. Suitable idler rollers 53 and 54 may be provided at the front and rear side respectively of the roller 8 to support the bead 4.

In operating my invention I first position a bead ring 4 upon the scored surface 9, the heel of the ring engaging the guide finger 41. I next feed a strip of fabric wider than the bead between the rollers 49 of the guide 43 over the plate 47 and attach the end thereof to the curved peripheral face of the bead ring with one edge of the strip aligned with the toe of the bead. I then lower the beam 11 by means of the device previously described until the rollers 10 and 14 engage the strip and the clutch sleeve 18 engages the sprocket 19, whereupon the rollers 10 and 14 grip and yieldingly compress the strip against the bead and shape it around the curved outer face and concave side face of the bead without wrinkling it or distorting the bead, as will be apparent without further explanation. The projecting free edge of the strip is received between the roller 14 and the edge of the roller 8 in the manner shown in Figure 4. I then raise the beam 11 and turn the bead with its flat face uppermost and position it in the groove 15. In this position of the bead, the projecting free edge of the attached strip rests upon the portion 16 of the roller 8. A fabric strip is then led through the guide 42 and its end attached to the flat face of the bead with the edge of the strip aligned with the toe of the bead. The beam is now lowered to engage the roller 17 with the second strip and compress it against the bead and also compress the free edges of the strip together against the surface 16.

The foregoing is a detailed description of a preferred embodiment of my invention, but it is not to be construed as limiting me to the precise structural features and arrangements of parts described as changes and modifications may be resorted to within the spirit of my invention and the scope of the appended claims.

What I claim is:

1. Mechanism for covering tire beads comprising, a base member, a plurality of rollers mounted thereon for pressing strip material against the sides of the bead one of said rollers having a fixed axis of rotation the other rollers being movably mounted as a unit, said rollers being constructed to form separate cavities for receiving a bead when it is turned in different positions, and means for rotating one of the rollers.

2. Mechanism for covering tire beads comprising, a base member, a roller for supporting the bead, and a plurality of rollers movable as a unit arranged to cooperate with the first roller to press strip material against the bead said rollers being adapted to form separate cavities for receiving the bead when it is turned in different positions.

3. Mechanism for covering tire beads comprising, a base member, a driven roller for supporting a bead, a plurality of rollers movable as a unit arranged to cooperate with the first roller to press strip material against the bead said rollers being adapted to form separate cavities for receiving the bead when it is turned in different positions, and means for driving the first roller.

4. Mechanism for covering tire beads comprising, a base member, a roller upon the base member for supporting a bead, and a plurality of rollers movable as a unit arranged to cooperate with the first roller to yieldingly press strip material against the bead said rollers being adapted to form separate cavities for receiving the bead when it is turned in different positions.

5. Mechanism for covering tire beads comprising, a base member, a bead supporting roller upon said member having a fixed axis of rotation, and a plurality of rollers movable as a unit arranged to cooperate with the first roller to press strip material against the bead said rollers being adapted to form separate cavities for receiving the bead when it is turned in different positions.

6. Mechanism for covering tire beads comprising, a base member, a bead supporting roller upon said member having a fixed axis of rotation, a plurality of rollers movable as a unit arranged to cooperate with the first roller to press strip material against the bead said rollers being adapted to form separate cavities for receiving the bead when it is turned in different positions, and means for moving the second rollers toward or away from the first roller.

7. Mechanism for covering tire beads with strip material comprising, a base member, a bead supporting roller upon the base member having a fixed axis of rotation, a series of movable rollers arranged to cooperate with the first roller to yieldingly press the bead therebetween said rollers being adapted to form separate cavities for receiving the bead when it is turned in a different position, and means for moving the series of rollers as a unit toward or away from the first roller.

8. Mechanism for covering tire beads with strip material comprising, a base member, a plurality of rollers mounted thereon one of the rollers having a fixed axis of rotation the other rollers being mounted to move as a unit to engage or disengage the fixed roller said rollers being constructed to form separate cavities for receiving a bead when it is turned in different positions, and means for moving said other rollers into yielding engagement with the fixed roller.

9. Mechanism for covering tire beads with strip material comprising, a base member, a plurality of rollers mounted thereon one of the rollers having a fixed axis of rotation the other rollers being mounted to move toward or away from the fixed roller said rollers being adapted to form separate spaced apart cavities, means for normally holding said other rollers away from the fixed roller, and a single means for moving said other rollers toward the fixed roller.

10. Mechanism for covering tire beads with strip material comprising, a base member, a plurality of rollers mounted thereon one of the rollers having a fixed axis of rotation the other rollers being mounted to move as a unit toward or away from the fixed roller said rollers being adapted to form separate spaced apart cavities, means for normally holding said other rollers away from the fixed roller, means for moving said other rollers into yielding engagement with the fixed roller, and means for rotating the fixed roller.

11. Mechanism for covering tire beads with strip material comprising, a base member, a plurality of rollers mounted thereon one of the rollers having a fixed axis of rotation the other rollers being mounted for movement into or out of engagement with the fixed roller, means for normally holding the other rollers in disengaged position, and means for moving said other rollers into engagement with the fixed roller and simultaneously rotating the fixed roller.

12. Mechanism for covering tire beads with strip material comprising, a base member, a plurality of rollers thereon one of said rollers having a fixed axis of rotation the other rollers being mounted for movement into or out of engagement with the fixed roller said rollers being adapted to form separate spaced apart cavities, means adjacent one of the rollers for guiding a strip in flat condition, and a single means for moving said other rollers into engagement with the fixed roller.

13. Mechanism for covering tire beads with strip material comprising, a base member, a plurality of rollers thereon one of said rollers having a fixed axis of rotation the other rollers being mounted for movement into or from engagement with the fixed roller said rollers being adapted to form separate spaced apart cavities, means adjacent one of the rollers for guiding a strip in flat condition, and means adjacent another of said rollers for guiding a strip and rounding it transversely so as to feed it in this condition onto a bead.

14. In mechanism of the class described, in combination, a base member, a bead supporting roller thereon having a fixed axis of rotation, a concave roller mounted to swing toward or from said roller, and a roller mounted to swing with the second roller the plane of the last roller being oblique to the plane of the second roller.

15. In mechanism of the class described, in combination, a base member, an elongated bead supporting roller thereon having a fixed axis of rotation, a series of spaced apart rollers mounted to swing toward or from the first roller, means adjacent one roller of the series for guiding a strip of fabric in flat condition, and means adjacent another roller of said series for guiding a strip and rounding it transversely so as to feed it in this condition onto a bead.

16. In mechanism of the class described, in combination a base member, an elongated bead supporting roller thereon, a beam arranged to swing above the roller, a concave roller upon the beam, a roller upon the beam disposed in a plane oblique to the plane of the second roller, and a strip guide carried by the beam in front of the second roller.

17. In mechanism of the class described, in combination, a base member, an elongated bead supporting roller thereon having a groove adjacent one end thereof, a beam mounted to swing toward or from the roller, spaced apart rollers upon the beam adapted to engage the first roller, and a roller adjacent one of the spaced apart rollers disposed in a plane oblique to the plane of said roller.

18. In mechanism of the class described, in combination, a base member, an elongated bead supporting roller on the base member having a groove adjacent one end thereof, a beam mounted to swing toward or from the roller, means for normally holding the beam away from the roller, spaced apart rollers upon the beam for engaging the first roller one roller being adapted to span the groove and a portion of the first roller, means for swinging the beam to position the last rollers in yielding engagement with the first roller, and means adapted to rotate the first roller as said last rollers are engaged with the first roller.

19. In mechanism of the class described, a base member, an elongated bead supporting roller upon the member having a circumferential groove thereon, a beam mounted to swing toward or from the roller, spaced apart rollers upon the beam for engaging the first roller one roller being of greater width than said groove, and a roller adjacent one of the spaced apart rollers disposed in a plane oblique to the plane of said roller.

20. In mechanism of the class described, a base member, an elongated bead supporting roller upon the member having a circumferential groove thereon, a beam mounted to move toward or from said roller, spaced apart rollers upon the beam for engaging the first roller, a roller upon the beam disposed in a plane oblique to the plane of one of said spaced apart rollers, and means for yieldingly moving the beam toward the first roller.

21. In mechanism of the class described, in combination, a base member, a bead supporting roller thereon, a mounting arranged to move toward or from the roller, complemental rollers upon the mounting for cooperating with the first roller in covering the bead one of said last rollers being oblique to the other, and a strip guide upon the mounting including ironing and tensioning devices.

22. In mechanism of the class described, in combination, a base member, a cylindrical bead supporting roller thereon having a circumferential groove therein the shape of an inverted clincher bead, a mounting above the roller arranged to move toward or from the roller, a flat surfaced roller upon the mounting of greater width than said groove, an adjustable strip guide upon the mounting in front of the second roller, a guide upon one side of the first roller for preventing lateral movement of the bead relative to said roller, a second guide upon the opposite side of the first roller for preventing lateral movement of the bead, and means for yieldingly moving the mounting toward the first roller.

23. In mechanism of the class described, in combination, a base member, a cylindrical bead supporting roller thereon having a circumferential groove therein the shape of an inverted clincher bead, a mounting arranged to move toward or from the roller, a flat surfaced roller upon the mounting of greater width than said groove, an adjustable strip guide upon the mounting for guiding different widths of strips, means for moving the mounting to yieldingly engage the second roller with the first roller, and means for rotating the first roller as the rollers are brought in engaging position.

24. In mechanism of the class described, in combination, a base member, a bead supporting roller thereon, a mounting arranged to move toward or from the roller, a concave roller on the mounting for engaging the first roller, a roller upon the mounting adjacent the second roller disposed in a plane oblique to the plane of said second roller, a strip guide on the mounting embodying an ironing shoe and tensioning devices, means for moving the mounting to yieldingly engage the second roller with the first roller, and means adapted to rotate the first roller upon engagement of said first and second rollers.

25. In mechanism of the class described, in combination, a base member, a bead supporting roller thereon, a series of rollers mounted to swing above the first roller one roller of the series being oblique to the plane of another roller of said series said rollers being constructed to form a cavity corresponding to the cross-sectional contour of a clincher head and a second cavity corresponding to the cross-sectional contour of an inverted clincher bead, and means for rotating one of the rollers.

26. In mechanism of the class described, in combination, a plurality of rollers adapted to form a cavity corresponding in shape to the cross-sectional contour of a tire bead, and a strip guide comprising an elongated shoe having a convex ironing face said shoe being provided at one end with an upstanding lug for rounding the strip and means at the other end for yieldingly gripping the strip.

27. In a device of the character described, a roller for supporting and rotating a bead, a second roller movable toward and from the first roller for pressing a fabric covering strip on said bead and means controlled by the movement of the second roller for rotating the first roller when the second roller is moved into engagement with the first roller.

EDWARD D. PUTT.